(12) United States Patent
Venkatram et al.

(10) Patent No.: US 6,508,562 B1
(45) Date of Patent: Jan. 21, 2003

(54) INSTRUMENT CLUSTER REFLECTOR

(75) Inventors: Sanjiv Venkatram, Canton, MI (US); Ching Fong, Canton, MI (US)

(73) Assignee: Yazaki North America, Inc., Canton, MI (US)

(*) Notice: Subject to any disclaimer, the term of this patent is extended or adjusted under 35 U.S.C. 154(b) by 0 days.

(21) Appl. No.: 09/985,530

(22) Filed: Nov. 5, 2001

(51) Int. Cl.⁷ .................. G01D 11/28; F21V 7/06
(52) U.S. Cl. .................. 362/23; 362/297; 362/346; 362/348; 116/286
(58) Field of Search .................. 362/23–30, 85, 362/297, 346–350; 116/286

(56) References Cited

U.S. PATENT DOCUMENTS

| | | | |
|---|---|---|---|
| 35,644 A | * 6/1862 | Williams | 362/350 |
| 1,639,363 A | * 8/1927 | Balsillie | 362/348 |
| 2,831,453 A | * 4/1958 | Hardesty | 362/26 |
| 3,040,994 A | * 6/1962 | Anderson et al. | 362/297 |
| 3,223,833 A | * 12/1965 | Protzmann | 362/26 |
| 3,401,258 A | * 9/1968 | Guth | 362/349 |
| 3,705,303 A | 12/1972 | Willis, Jr. et al. | |
| 3,758,770 A | 9/1973 | Morasz | |
| 4,351,018 A | * 9/1982 | Fratty | 362/346 |
| 5,556,187 A | 9/1996 | Furuya et al. | |
| 5,567,042 A | 10/1996 | Farchmin et al. | |
| 5,896,093 A | 4/1999 | Sjobom | |
| 6,168,293 B1 | 1/2001 | Lieszkovszky et al. | |
| 6,338,564 B1 | * 1/2002 | Jordan et al. | 362/346 |

* cited by examiner

*Primary Examiner*—Alan Cariaso
(74) *Attorney, Agent, or Firm*—Daniel R. Edelbrock

(57) ABSTRACT

A reflector for backlighting an indicating instrument has two groups of flutes arranged for evenly distributing light and reducing bright spots. A plate has a recessed portion for receiving the indicating instrument and a semi-bowl-shaped compartment extending away from the plate and opening to the indicating instrument. The compartment has a base with a central projection formed by parabolic flutes and a semi-circular wall connecting the base with the recessed portion of the plate. The semi-circular wall has an inner surface facing the parabolic flutes. The inner surface has flutes extending in a radial direction from the base. Two apertures are positioned in the compartment across a boundary between the base and semi-circular wall. The apertures each receive a light emitting diode mounted on a printed circuit board when the board is assembled on the reflector. The parabolic flutes distribute the light from the light emitting diodes to evenly backlight the indicating instrument. The radial flutes diffuse the light to prevent hot or bright spots from developing under the indicating instrument. The light is further scattered by a chrome coating applied on a surface of the indicating instrument facing the compartment.

20 Claims, 2 Drawing Sheets

INSTRUMENT CLUSTER REFLECTOR

BACKGROUND OF THE INVENTION

1. Field of the Invention

This invention is directed in general toward a device for backlighting an indicating instrument and more specifically to a reflector that evenly and efficiently distributes light to modules in a vehicle instrument cluster.

2. Discussion of Related Art

Traditionally, analog instrument clusters on vehicle instrument panels have been illuminated by an arrangement of light guides, reflectors and light bulbs. For example, U.S. Pat. No. 5,556,187 illustrates a speedometer dial lit by multiple bulbs. One reflector guides the light from the bulbs to a pointer mounted on the dial. Another reflector concentrates light from the bulbs onto the first reflector. This requires a high part count and a large space requirement that reduces packaging efficiency. The use of bulbs shortens the life of instrument clusters. In those clusters that use light guides to transmit the light from bulbs to a dial face, the dial face is often unevenly lit with some sections being brighter or dimmer than other sections. Those sections furthest away from the bulbs are dimmer. A dial or indicating instrument is typically made from a clear or transparent piece of plastic. Portions of the dial other than the numbers and tick marks are then screenprinted with colors such as black or white. To provide uniform lighting across the dial, those sections that would ultimately be brighter when the dial is backlit are given additional screenprinted spots or layers. These are called compensation passes and add considerable cost to the production of the indicating instrument.

Light emitting diodes expend considerably less power than light bulbs, but more are needed to provide adequate illumination. Devices have been developed in other environments to reduce the need for large clusters of light emitting diodes. U.S. Pat. No. 5,896,093, for instance, sets forth a light assembly for a traffic sign. A fluted lens is used to magnify and focus the light from a relatively small set of light emitting diodes, increasing the intensity of the light and the distance at which the sign can be viewed.

Reflectors with multiple fluted sections are known in the art. For example, U.S. Pat. No. 3,705,303 discloses a reflector for fitting over a lamp. The reflector has an upper fluted conical section and a lower fluted skirt portion that flares outward. It is used in combination with a refractor to spread light simultaneously over large floor and ceiling areas. Reflectors with variously shaped parts have also been used for backlighting displays. U.S. Pat. No. 5,567,042 describes a backlight unit for a liquid crystal display, the unit including a reflector. The reflector has a reflective surface having a series of differently shaped sections. Some of the sections are parabolic to collimate fluorescent light so it is directed toward the display.

SUMMARY OF THE INVENTION

Accordingly, it is an object of this invention to provide a reflector that evenly distributes light across a viewing surface of an indicating instrument.

Another object of the invention is to enable a small number of light emitting diodes to deliver outstanding backlighting for an indicating instrument.

A further object of the invention is to furnish an indicating instrument that has few parts, is easily assembled, and is inexpensively and efficiently backlit.

In carrying out this invention in the illustrative embodiment thereof, a reflector has first and second sets of flutes, and apertures for receiving two light emitting diodes. The flutes are located in a semi-bowl-shaped chamber or compartment behind an indicating instrument. The flutes of the first set are parabolic and centrally located in the compartment. The flutes of the second set extend radially outward from the first set. The apertures are located in a predetermined position within the chamber adjacent the radial flutes. An indicating instrument with a backlightable scale is assembled on a first side of the reflector over the chamber. A printed circuit board having two light emitting diodes is assembled on a second, opposite side of the reflector such that the two light emitting diodes protrude through the apertures into the chamber. The parabolic nature of the first set of flutes spreads the light radially outward, in an even fashion. The radial flutes diffuse the light and prevent bright or hot spots from forming under the indicating instrument. The undersurface of the indicating instrument has a reflective chrome coating that prevents absorption of the light and helps scatter it evenly across the indicating instrument.

The reflector provides even backlighting without dial compensation. It also furnishes an intensity of greater than ten candelas per meter squared with the use of only two light emitting diodes.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
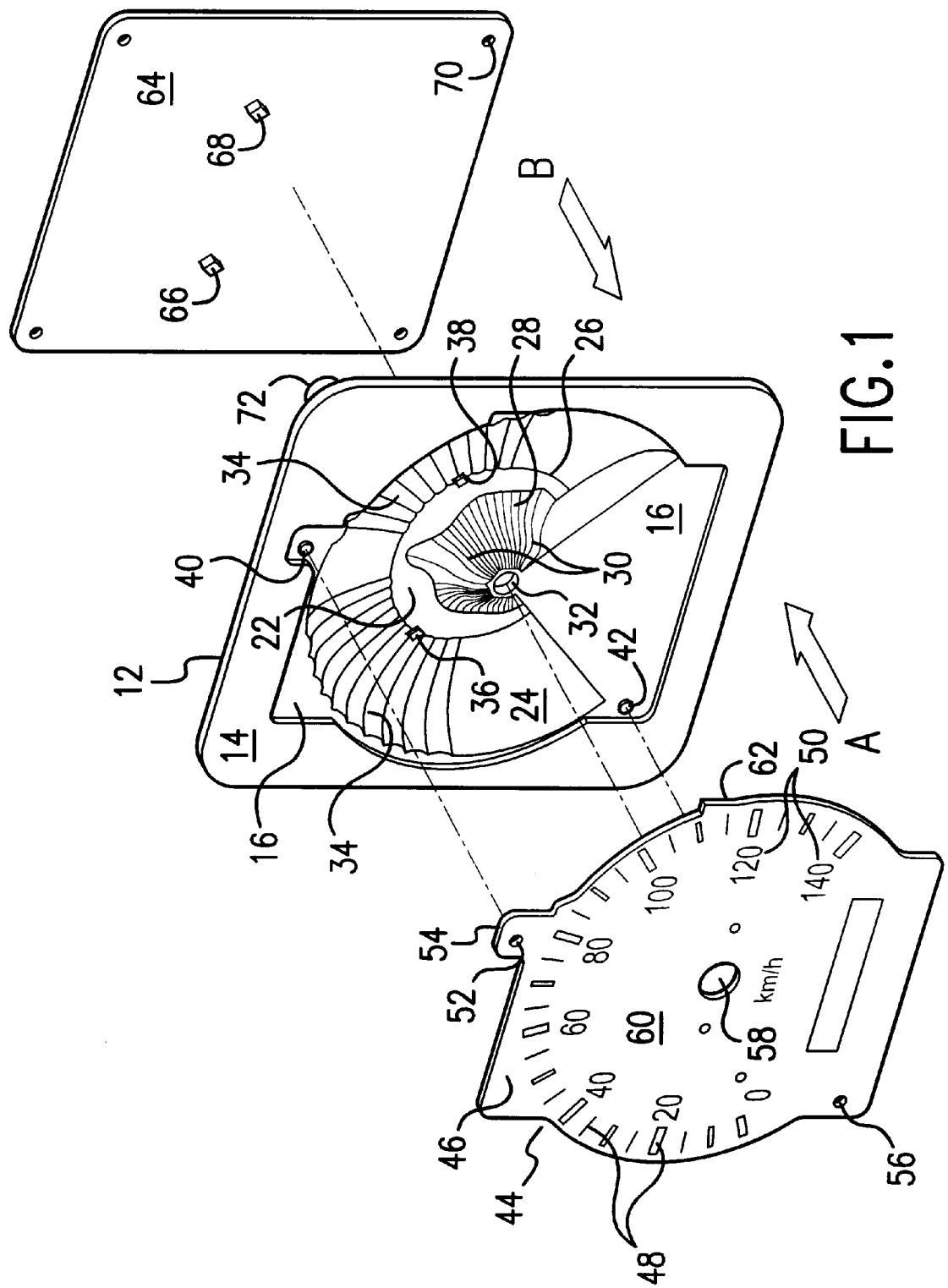
FIG. 1 is an exploded perspective view of an assembly including a reflector according to the present invention in combination with a dial and printed circuit board.
Figure 2:
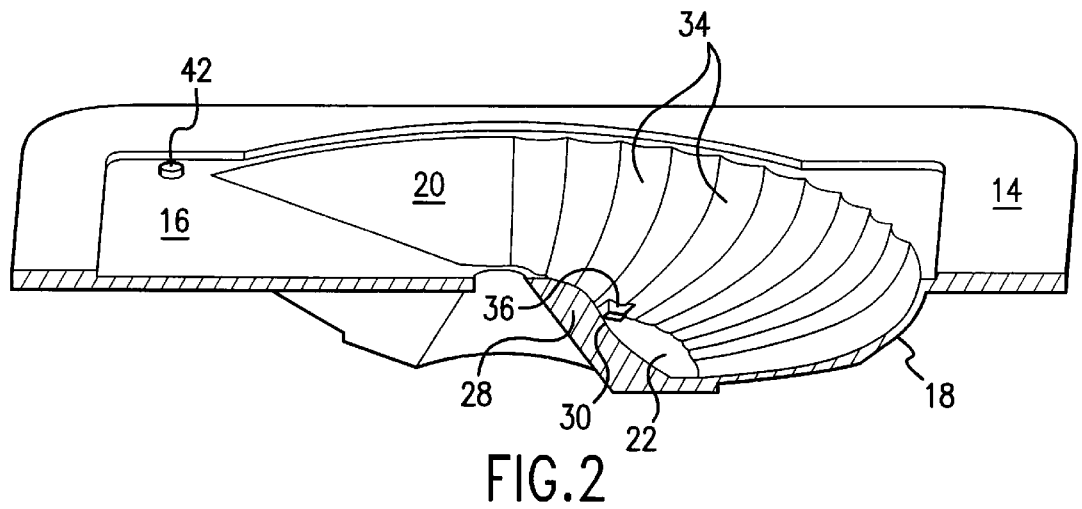
FIG. 2 is a cross-sectional side view of the reflector.
Figure 3:
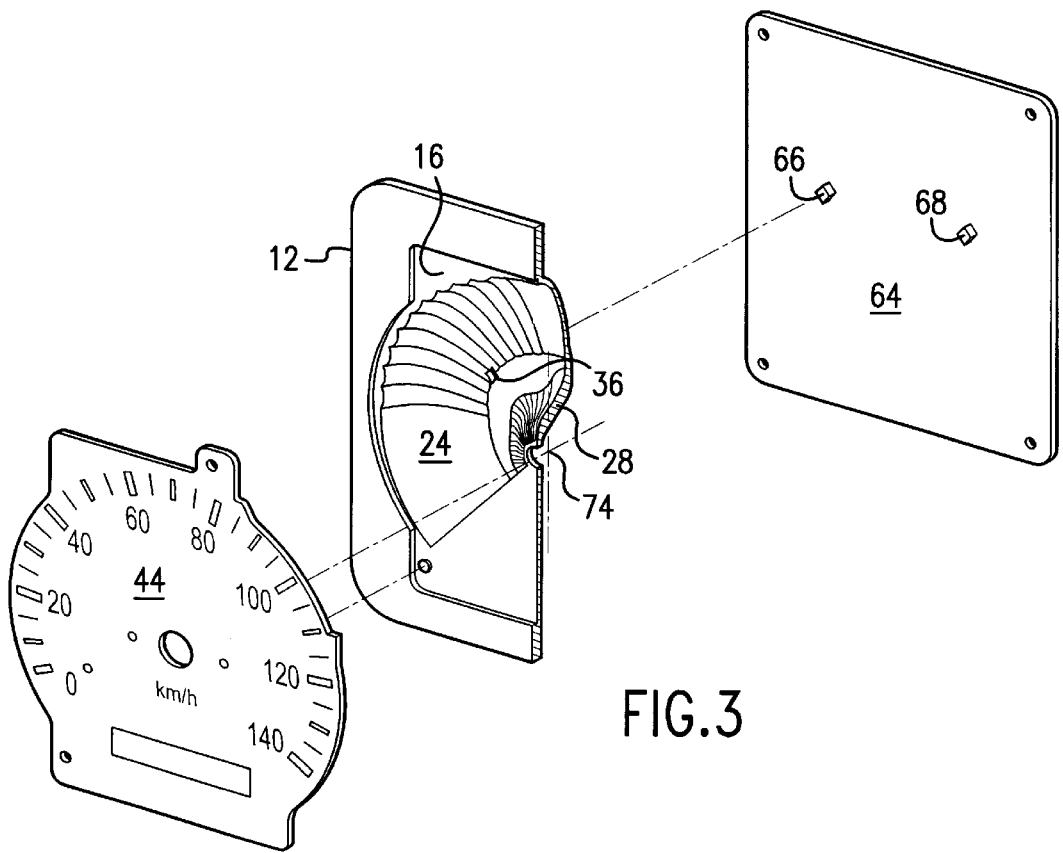
FIG. 3 is an exploded perspective view of the assembly with part of the reflector cut away.

Referring now to FIGS. 1–3, a reflector 12 according to the present invention comprises a plate 14 with a recessed portion 16. A partially bowl-shaped part 18 extending away from the plate 14 is integrally joined to the recessed portion 16 and forms a compartment 20 opening in the direction of the recessed portion and plate 14. The compartment 20 has a base 22 and an semi-annular or semi-circular wall 24 extending around an outer periphery 26 of the base 22 and joining the base to the recessed portion 16 of the plate at an edge of the wall distal from the base. The base 22 has a centrally located projection 28 extending in the direction of the plate 14.

The projection 28 has an outer surface formed by or shaped as multiple parabolic flutes 30. An opening 32 extends through the projection. The semi-circular wall 24 has an inner surface facing the projection 28. The inner surface is formed by concave radial flutes 34 extending at an outward angle from the outer periphery 26 of the base 22. As illustrated, it is not necessary for the radial flutes to extend completely along the circumference or periphery of the semi-circular wall 24. The compartment 20 is widened as the radially fluted wall broadens to the recessed portion 16 of the plate 14. Two apertures 36 and 38 are located across a segment of the base 22 from each other. The apertures are on the boundary between the base and semi-circular wall, extending across the outer periphery 26 of the base into the adjacent radial flutes. The apertures 36 and 38 are shown for illustrative purposes as being generally rectangular.

The reflector works best if made from a plastic white in color. Polypropylene, for example, is a good choice because it is easily and inexpensively moldable. Other materials, such as polycarbonate, could be used instead. A locating post 40 is positioned in the recessed portion 16 adjacent the plate surface 14 at an upper end of the reflector. A second locating post 42 is positioned across the recess from the first locating post 40 adjacent a lower corner of the plate.

A dial or indicating instrument 44, shown as a speedometer for illustrative purposes, has a flat viewable face 46 having tick marks 48 adjacent its perimeter and printed with numbers or indicia 50. The dial has a locating hole 52 in a tab 54 at an upper edge, a second locating hole 56 in a lower corner of the dial face and a central hole 58. The dial can be formed from, for example, a clear plastic material. A color 60 such as black is screenprinted onto the dial face 46 with the exception of the areas of the tick marks and indicia. These areas are left clear or otherwise relatively transparent. An opposite back face of the dial is coated with chrome 62. The dial 44 sits on the reflector 12. It is assembled into the recessed portion 16 of the plate 14 in the direction of arrow A. The locating hole 52 receives the locating post 40 and the locating hole 56 receives the second locating post 42 to properly align the dial on the reflector. The central hole 58 aligns with the opening 32 extending through the projection 28 of the reflector 12. A pointer mechanism (not shown) would extend through the projection 28 and opening 32 of the reflector, and through the central hole 58 of the dial. The dial can be secured in the recessed portion by adhesive between the back face of the dial and a surface of the recessed portion 16 of the reflector, or by some other conventional manner.

A printed circuit board (PCB) 64 is assembled onto the reflector from the opposite direction indicated by arrow B. The PCB has two surface mounted light emitting diodes 66 and 68 located and spaced to fit into the apertures 36 and 38, respectively, on the reflector 12. The PCB receives current from the vehicle electrical system to power the light emitting diodes. A printed circuit (not shown) on the board electrically connects the light emitting diodes. Each corner of the PCB has a mounting hole 70 for helping to secure the PCB to the reflector. For instance, screws extending through the mounting holes 70 could be received in internally threaded bosses 72 (only one is shown) extending from a back side of the plate 14. Other ways of attaching the PCB to the reflector could be used, though all must allow for the detail that the PCB would be spaced from the plate 14 by the depth of the semi-bowl-shaped part 18.

When the PCB 64 and reflector 12 are attached together, the light emitting diodes 66 and 68 protrude through the apertures 36 and 38, respectively, into the reflector compartment 20. In operation, the parabolic flutes 30 on the centrally located projection 28 of the reflector spread light uniformly about the compartment 20. The radial flutes 34 on the inner surface of the semi-circular wall 24 evenly spread the light outwards, reducing or preventing hot or bright spots. The chrome coating 62 on the back face of the dial 44 prevents the absorption of light, scattering the light to help provide consistent backlighting across the viewing face of the dial. The numbers or other indicia 50 and tick marks 48 are backlit and illuminated at the same brightness all along the dial. The intensity of the reflected light from just the two light emitting diodes has been measured to be greater than ten candelas per meter squared.

The reflector could be used on other indicating instruments within an instrument cluster of a vehicle instrument panel. The plate 14 of the reflector could be manufactured in the form of a housing for multiple indicating instruments, with a compartment 20 for each instrument. The PCB board would be increased in size and used to mount additional sets of light emitting diodes.

The two side-mounted light emitting diodes are positioned in the reflector at specifically predetermined angles to provide the most efficient light source for the indicating instrument. Though the same flute configuration can be used with different dials, the position of the diodes depends on the angle between the lowest and highest readings of the lightable scale on the indicating instrument. For example, the angle on the illustrated embodiment between the 0 km/h mark and the 140 km/hr mark around the outer rim of the dial 44 is about two-hundred and thirty degrees. The position of each light emitting diode 66 and 68 providing the most uniform backlighting of the indicating instrument has been found to be thirty degrees from a vertical line running through a central axis 74 of the projection opening 32, as measured from the central axis of the opening. For larger or smaller scale angles, the location of the apertures 36 and 38, and thus the positions of the light emitting diodes on the PCB, would have to be changed to achieve the most even backlighting results.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A reflector for distributing light to an indicating instrument, the reflector comprising:

a plate;

a compartment extending from the plate, the compartment having a base and a semi-circular wall connecting the base to the plate;

a first set of flutes extending from the base, the flutes of the first set of flutes being parabolic in shape;

a second set of flutes formed on an inner surface of the circular wall; and at least one aperture in the compartment for receiving light to be diffused by the first and second sets of flutes.

2. The reflector of claim 1 wherein the second set of flutes extends in a radial direction from the base.

3. The reflector of claim 1 wherein the at least one aperture is positioned at a periphery of the base where the base joins the semi-circular wall.

4. The reflector of claim 1 wherein there are two apertures positioned across the base from each other on a boundary between the base and semi-circular wall.

5. A reflector for distributing light to an indicating instrument, the reflector comprising:

a plate having a recessed portion;

a compartment extending from the recessed portion of the plate, the compartment having a base and a semi-circular wall connecting the base to the plate;

a first set of flutes extending from the base;

a second set of flutes formed on an inner surface of the circular wall; and at least one aperture in the compartment for receiving light to be diffused by the first and second sets of flutes.

6. The reflector of claim 5 wherein the recessed portion is adapted to receive the indicating instrument.

7. The reflector of claim 6 further comprising at least one locating post protruding from the recessed portion and adapted to align the indicating instrument in the recessed portion.

8. A reflector for distributing light to an indicating instrument, the reflector comprising:

a plate;

a compartment extending from the plate, the compartment having a base and a semi-circular wall connecting the base to the plate;

a first set of flutes forming a projection extending from a central part of the base;

a second set of flutes formed on an inner surface of the circular wall; and at least one aperture in the compartment for receiving light to be diffused by the first and second sets of flutes.

9. The reflector of claim 8 wherein the flutes of the first set of flutes are parabolic in shape.

10. The reflector of claim 8 wherein the flutes of the second set of flutes extend in a radial direction from the base.

11. The reflector of claim 8 further comprising an opening extending through the projection.

12. A reflector comprising:

a base;

a plurality of parabolic flutes forming a projection extending from the base;

a wall surrounding the base and projection, the wall having a plurality of flutes extending radially from the base and facing the projection; and at least one aperture where the wall meets the base for admitting light into the reflector between the wall and the projection.

13. The reflector of claim 12 wherein the base has a semi-circular periphery and the wall is semi-annular.

14. The reflector of claim 13 wherein the projection is centrally located on the base.

15. The reflector of claim 12 wherein there are two apertures for admitting light into the reflector, the apertures being positioned across the base from each other in predetermined positions.

16. An indicating assembly comprising:

a dial;

a printed circuit board, at least one light source being mounted on the printed circuit board; and a reflector, the dial being mounted on the reflector and the reflector being attached to the printed circuit board, the reflector having a compartment, the compartment having a fluted central projection and peripheral flutes, the compartment further including at least one aperture for receiving the at least one light source, whereby light from the light source is diffused by the fluted central projection and the peripheral flutes to evenly light the dial.

17. The indicating assembly of claim 16 wherein the at least one light source is a light emitting diode.

18. The indicating assembly of claim 16 wherein the peripheral flutes extend in a radial direction from the central projection.

19. The indicating assembly of claim 16 wherein the fluted central projection has parabolic-shaped flutes.

20. The indicating assembly of claim 16 wherein the dial has a surface facing the reflector compartment, the surface being coated with chrome.

* * * * *